(No Model.) 10 Sheets—Sheet 1.

W. GLEDHILL.
MACHINE FOR TWISTING FRINGES.

No. 567,590. Patented Sept. 15, 1896.

Attest
Walter Donaldson
F. L. Middleton

Inventor
Walter Gledhill
by Richards & Co
Attys.

(No Model.) 10 Sheets—Sheet 3.

W. GLEDHILL.
MACHINE FOR TWISTING FRINGES.

No. 567,590. Patented Sept. 15, 1896.

Attest
Inventor
Walter Gledhill
by Richards & Co. Attys (No Model.) 10 Sheets—Sheet 4.

W. GLEDHILL.
MACHINE FOR TWISTING FRINGES.

No. 567,590. Patented Sept. 15, 1896.

WITNESSES:
E. B. Bolton
Otto Munk

INVENTOR
Walter Gledhill
BY
Richards
ATTORNEYS (No Model.) 10 Sheets—Sheet 5.
W. GLEDHILL.
MACHINE FOR TWISTING FRINGES.
No. 567,590. Patented Sept. 15, 1896.
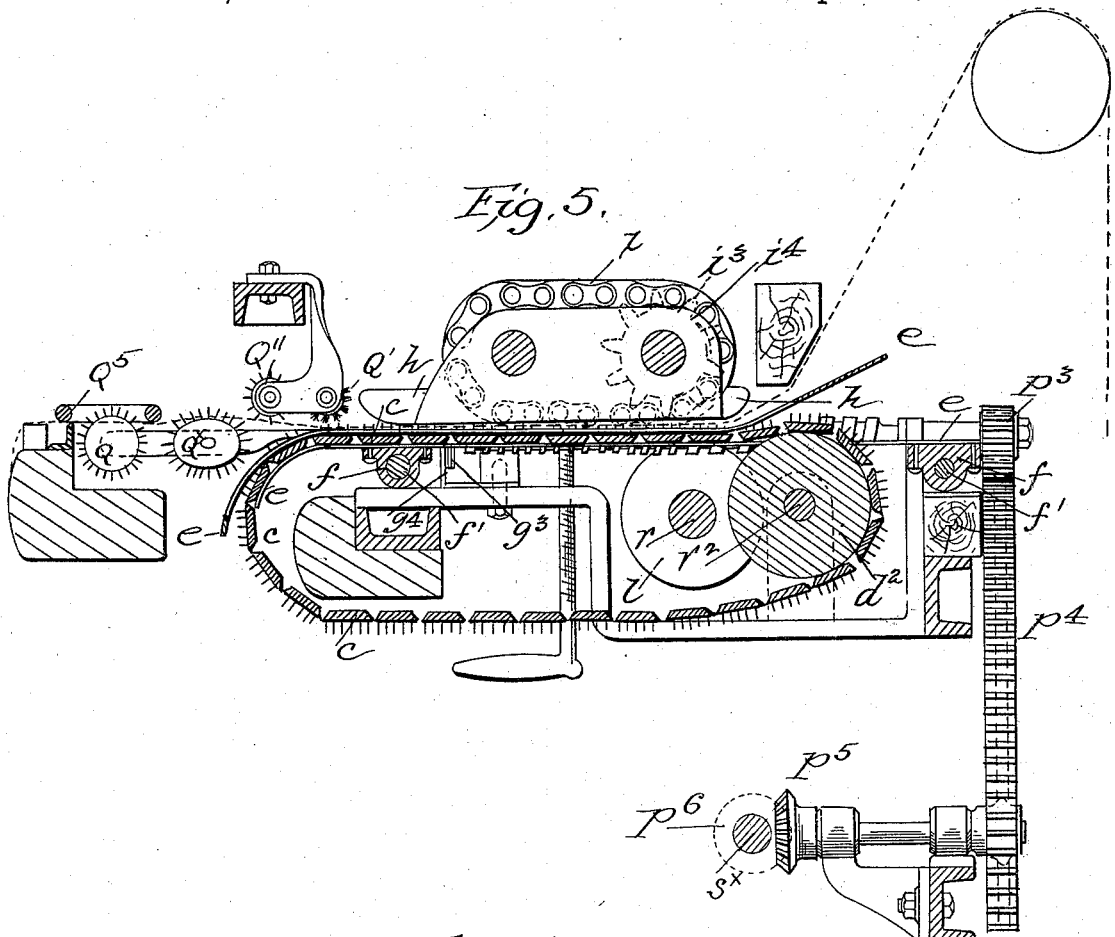
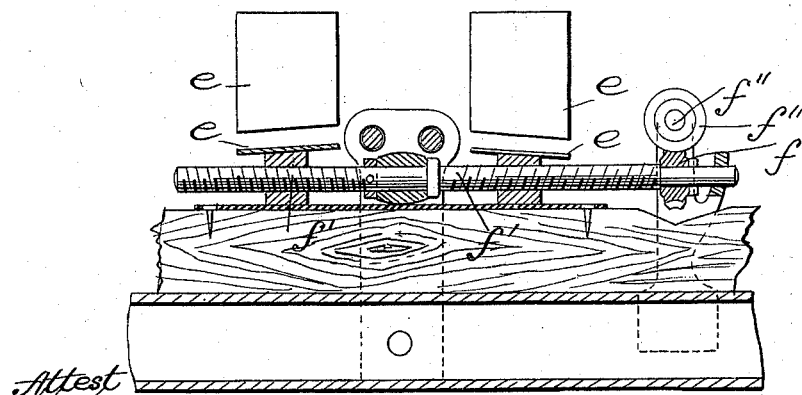

(No Model.) 10 Sheets—Sheet 6.
W. GLEDHILL.
MACHINE FOR TWISTING FRINGES.
No. 567,590. Patented Sept. 15, 1896.
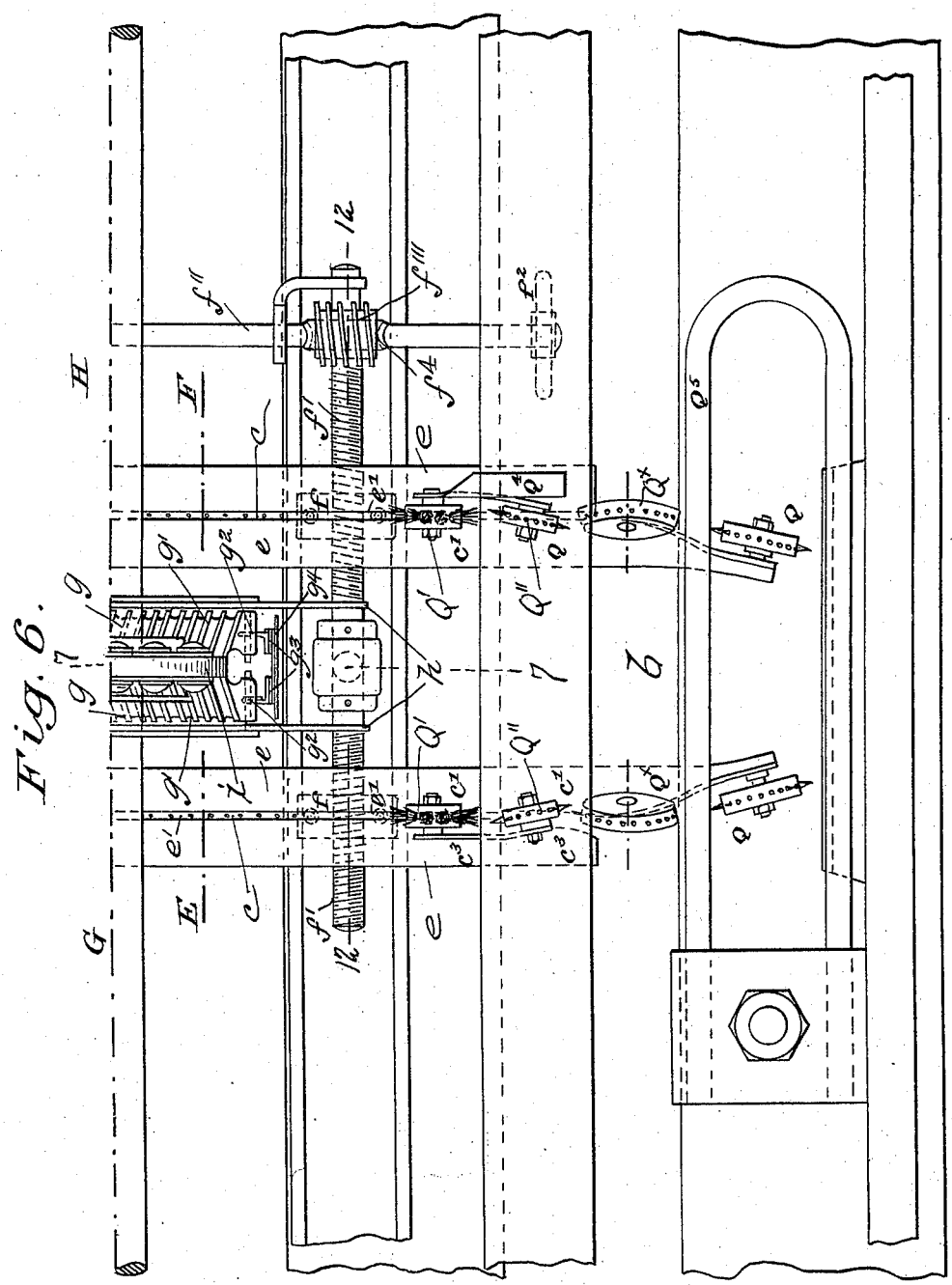
WITNESSES:
E. B. Bolton
Otto Munk
INVENTOR
Walter Gledhill
BY Richardson
ATTORNEYS

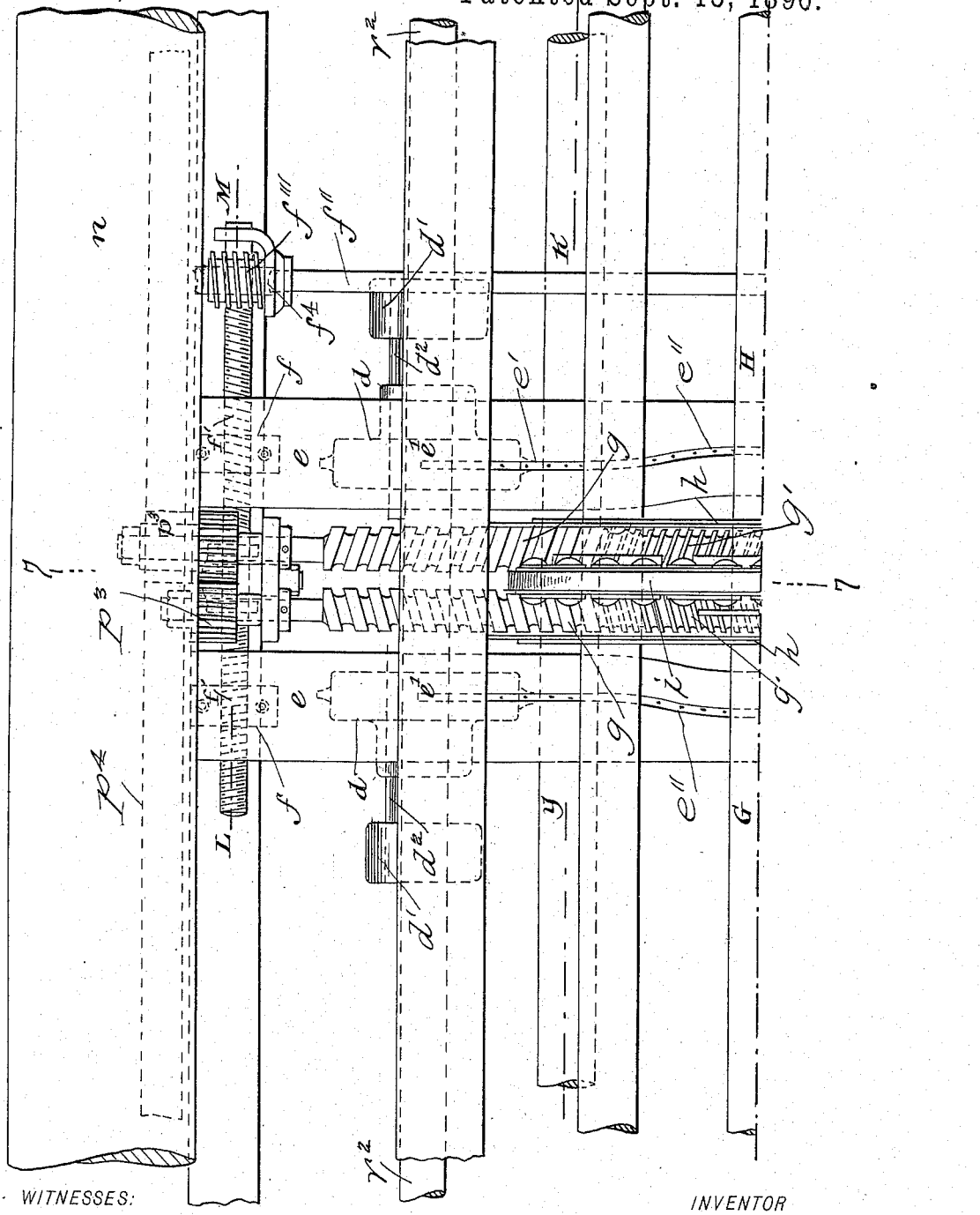

(No Model.) 10 Sheets—Sheet 8.
W. GLEDHILL.
MACHINE FOR TWISTING FRINGES.
No. 567,590. Patented Sept. 15, 1896.
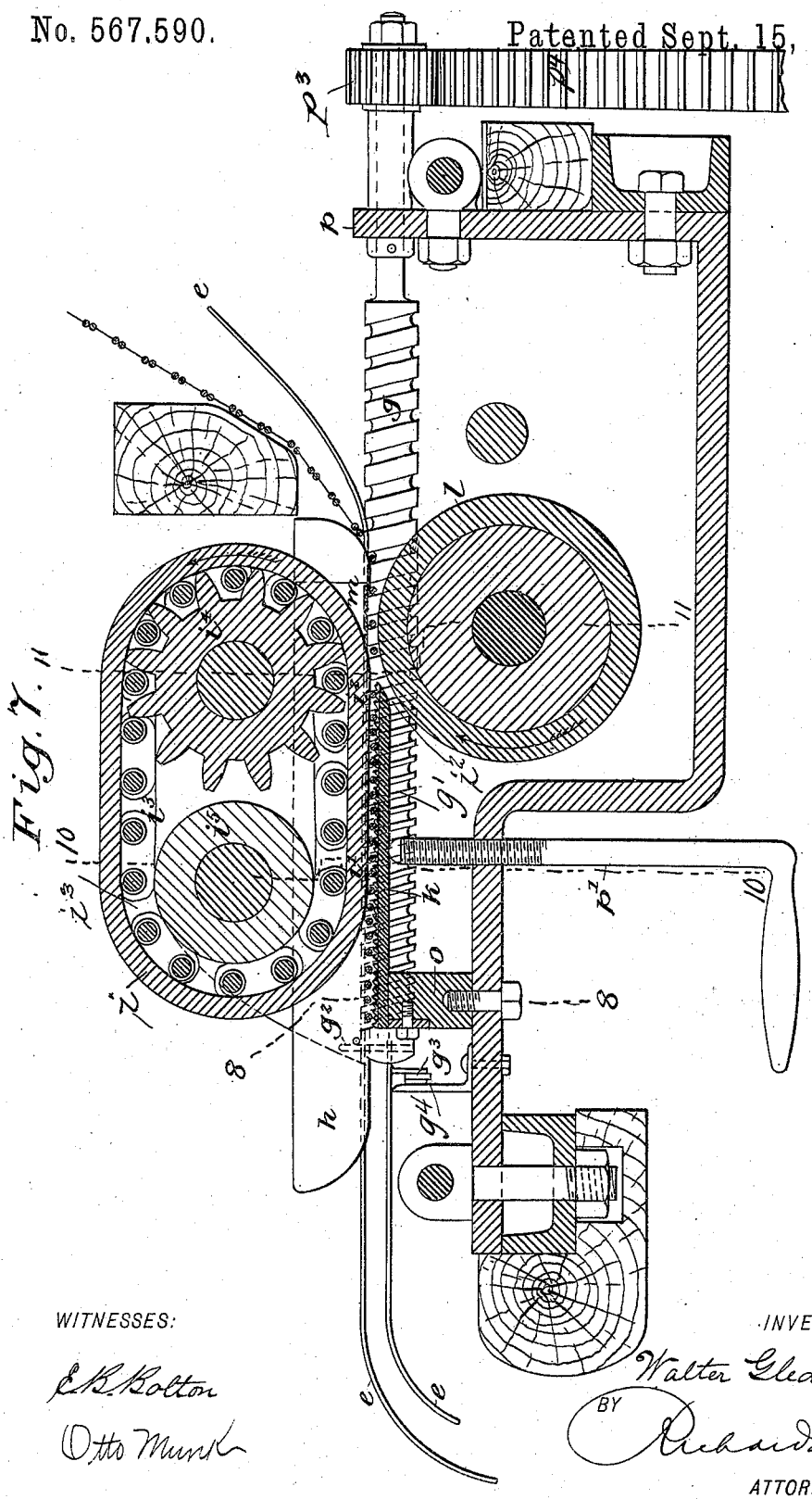
WITNESSES:
E. B. Bolton
Otto Munk
INVENTOR
Walter Gledhill
BY
Richardson
ATTORNEYS (No Model.) 10 Sheets—Sheet 9.
W. GLEDHILL.
MACHINE FOR TWISTING FRINGES.
No. 567,590. Patented Sept. 15, 1896.
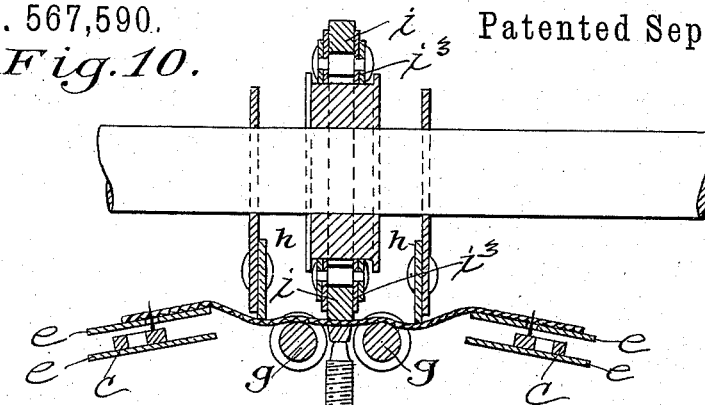
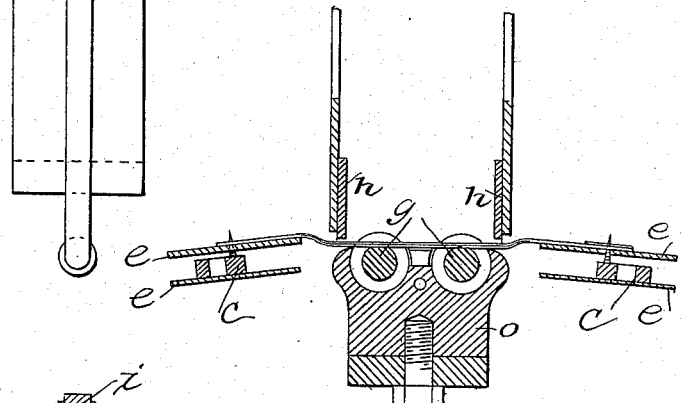
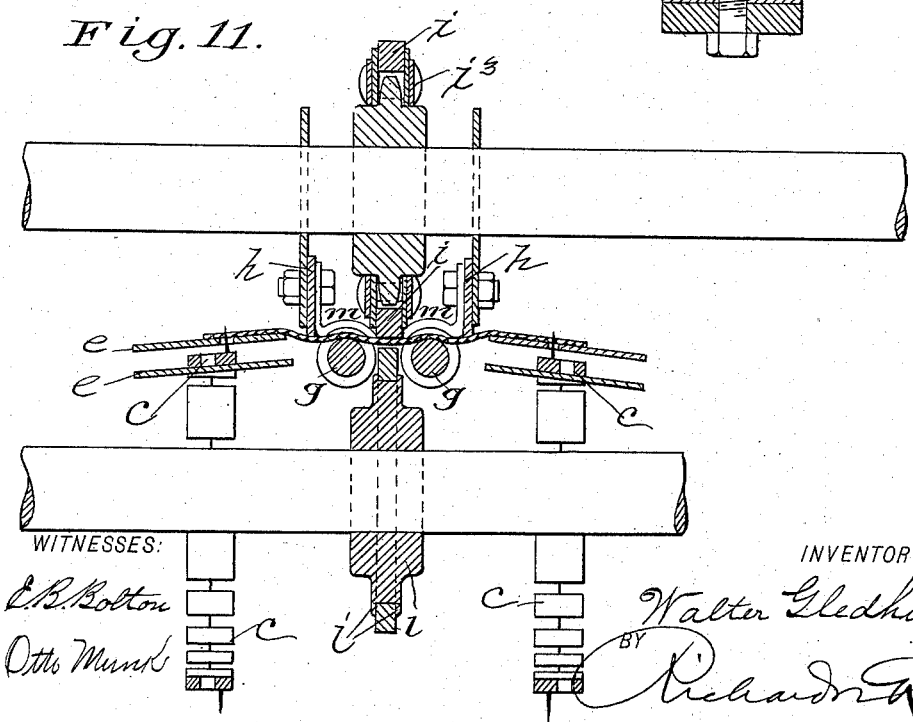
WITNESSES:
E. B. Bolton
Otto Munk
INVENTOR
Walter Gledhill
BY
Richards
ATTORNEYS (No Model.) 10 Sheets—Sheet 10.
W. GLEDHILL.
MACHINE FOR TWISTING FRINGES.
No. 567,590. Patented Sept. 15, 1896.
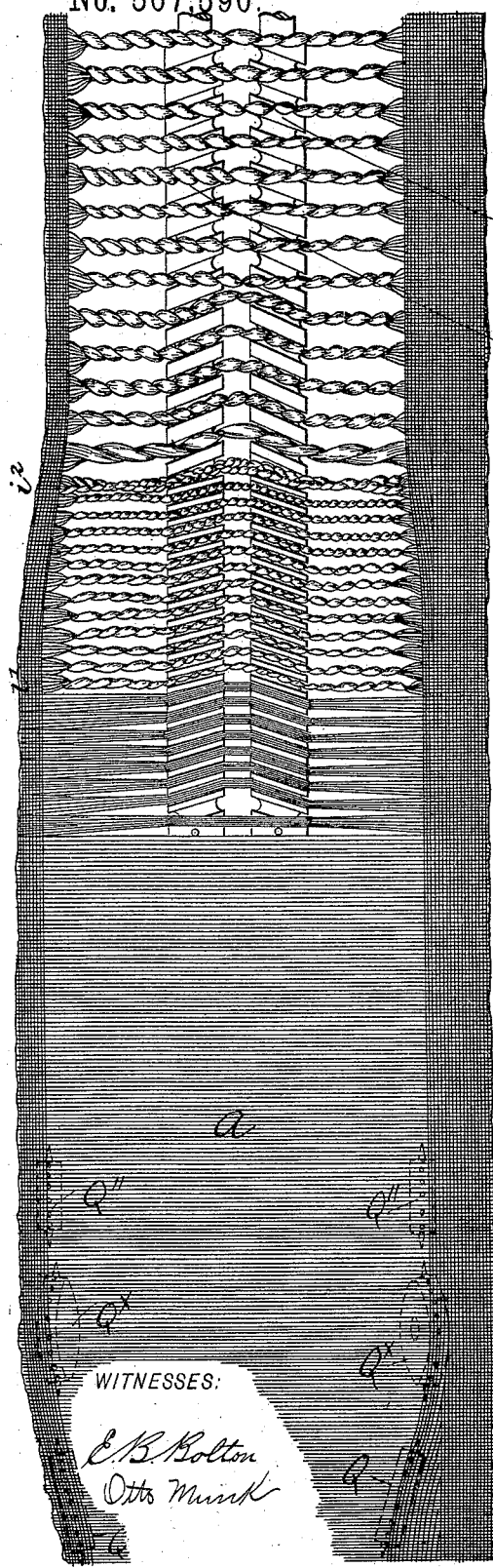
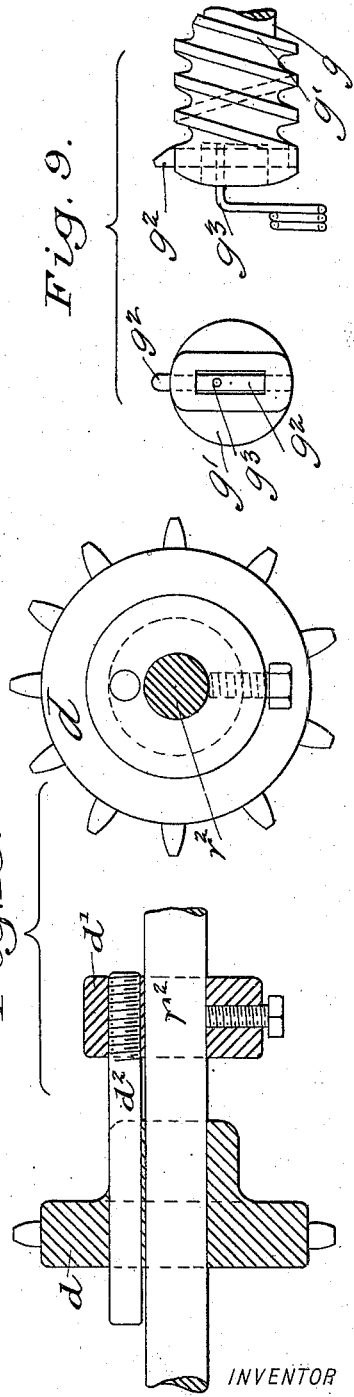
WITNESSES:
INVENTOR
Walter Gledhill
BY
Richards
ATTORNEYS

UNITED STATES PATENT OFFICE.

WALTER GLEDHILL, OF ST. PETERSBURG, RUSSIA.

MACHINE FOR TWISTING FRINGES.

SPECIFICATION forming part of Letters Patent No. 567,590, dated September 15, 1896.

Application filed October 14, 1895. Serial No. 565,603. (No model.)

*To all whom it may concern:*

Be it known that I, WALTER GLEDHILL, a British subject, residing in St. Petersburg, Russia, have invented certain new and useful Improvements in Machines for Twisting Fringes on Shawls, &c., of which the following is a specification.

In the weaving of shawls and plaids, &c., that have to be provided with a twisted fringe at the sides, a certain amount of reed-space is left without warp, and the weft is caught up by a few threads put into the reed at the required distance from the remainder of the warp. This weft serves for the purpose of being twisted into a fringe at the sides. And for the other ends a certain amount of warp is drawn in before starting the next shawl or plaid.

Figure 1:
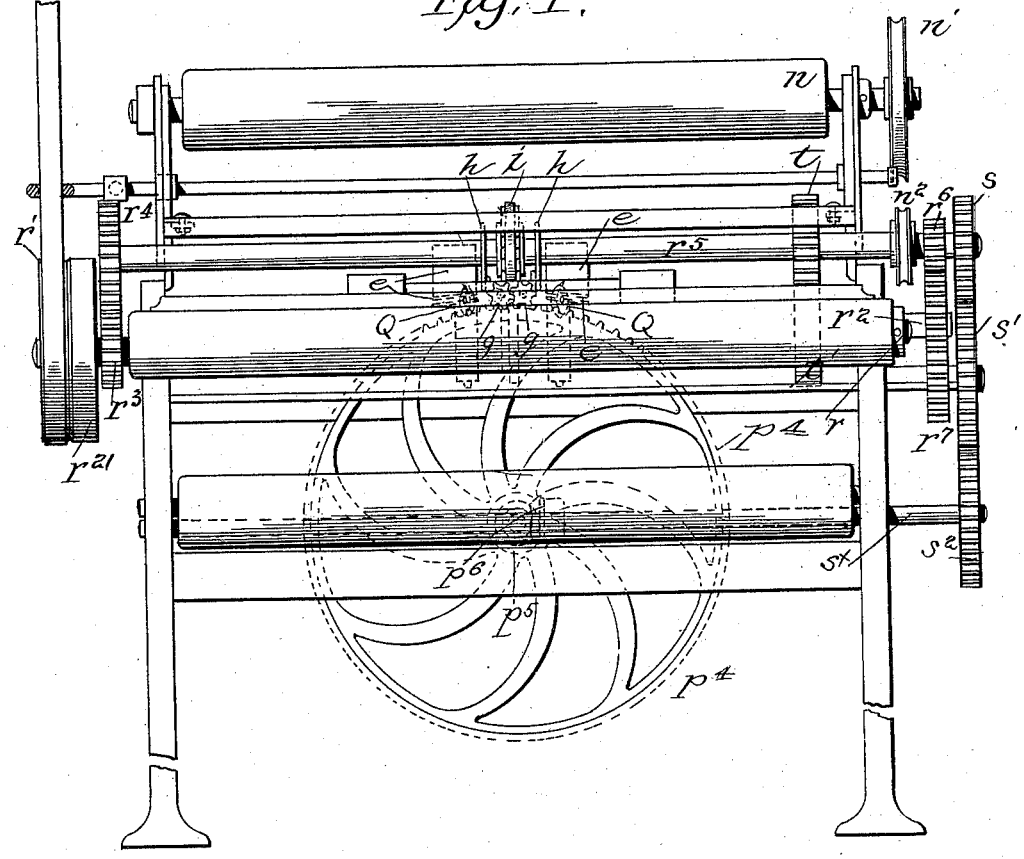
Figure 2:
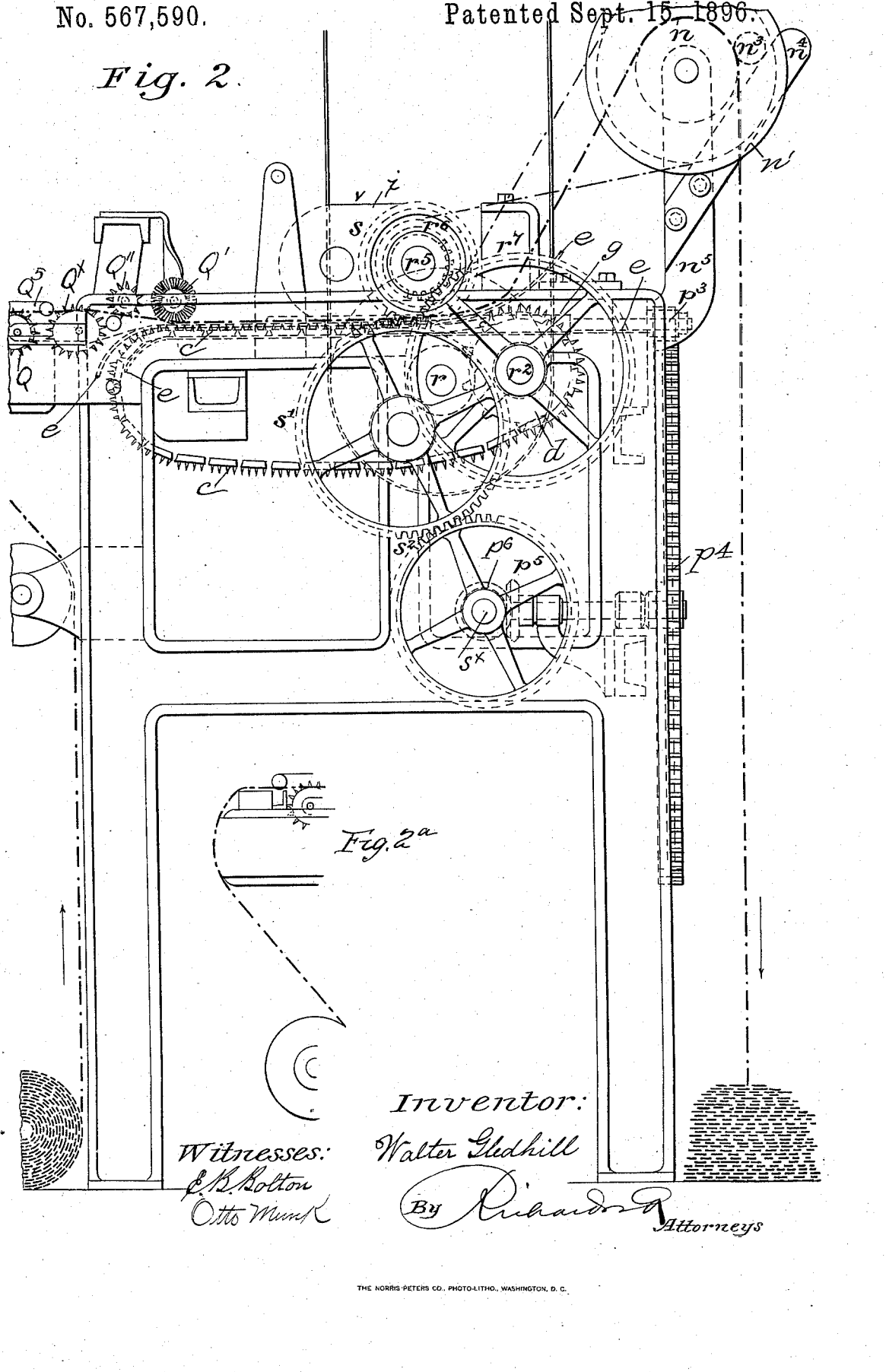
Figure 3:
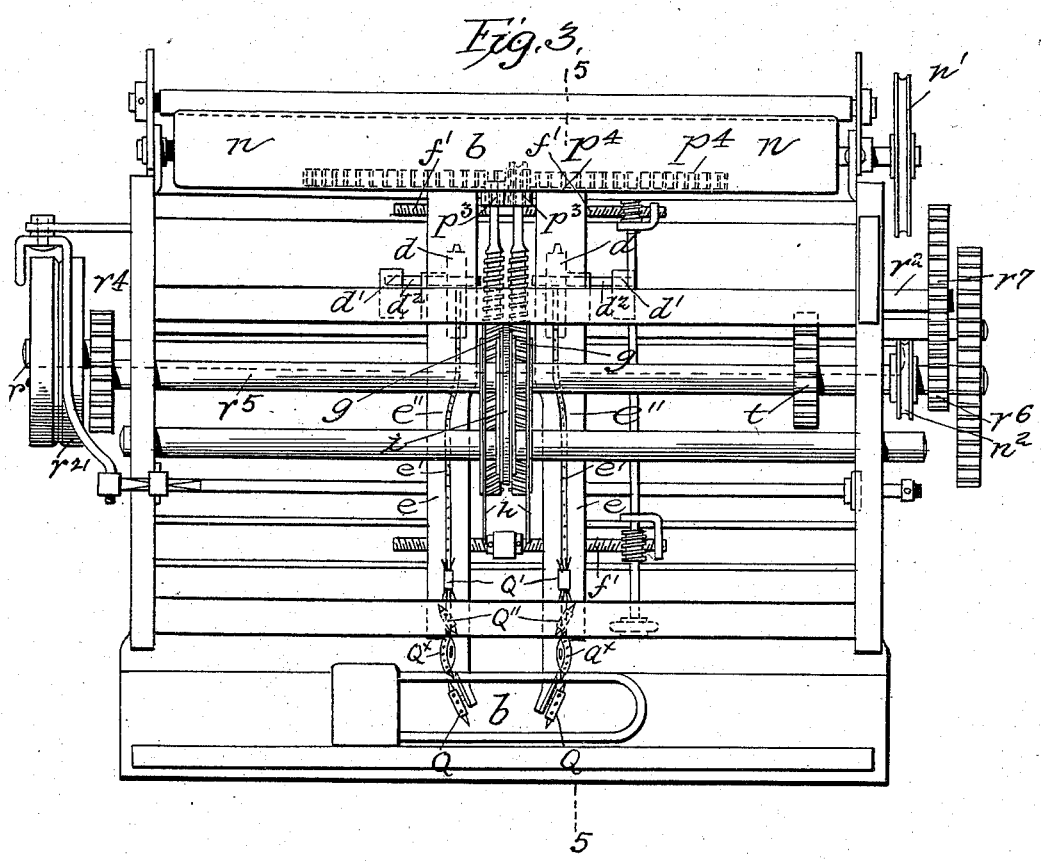
Figure 4:
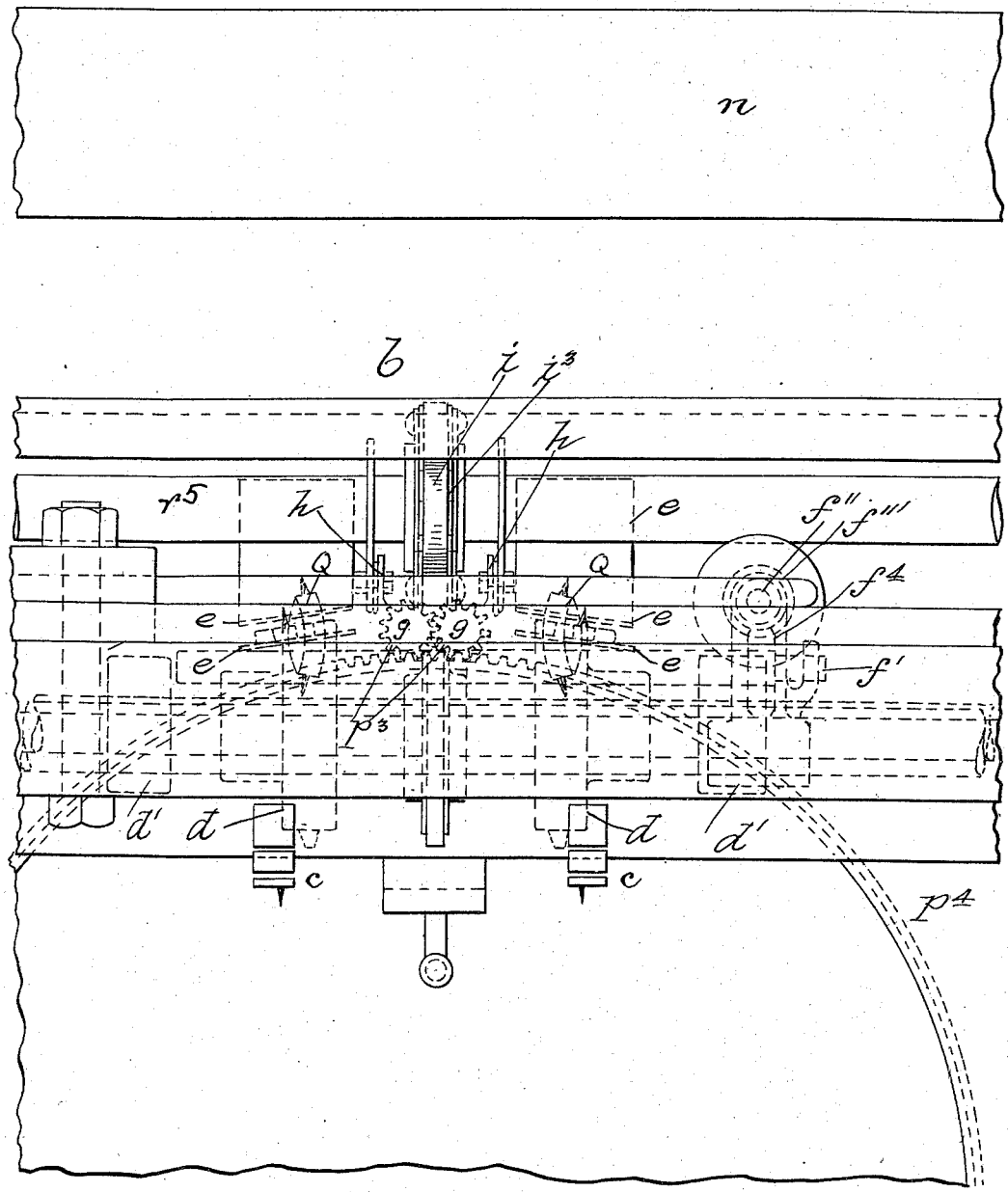

In the drawings, Figure 1 is a front view of the machine. Fig. 2 is a side view. Fig. $2^a$ is a detail showing a small portion of the machine omitted from Fig. 2. Fig. 3 is a plan view; Fig. 4, an enlarged detail view of the central portion of Fig. 1. Fig. 5 is a vertical section from front to rear along the slot of the guide-plate $e$ on line 5 5 of Fig. 3. Fig. 6 is a detail plan view of the front portion of the machine. Fig. $6^a$ is a detail plan view of the rear part of the machine. Fig. 7 is a detail vertical section on line 7 7 of Figs. 6 and $6^a$. Fig. 8 is a detail sectional view on line 8 8 of Fig. 7. Fig. 9 is a detail view of the front ends of the screws. Fig. 10 is a detail sectional view on line 10 10 of Fig. 7. Fig. 11 is a detail sectional view on line 11 11 of Fig. 7. Fig. 12 is a sectional view on line 12 12 of Fig. 6. Fig. 13 is a detail sectional view of the adjustable sprockets for the carriers. Fig. 14 is a diagrammatic view showing the screws and the material acted on thereby.

At $a$, Fig. 14, is given an illustration of the side of a shawl before it is treated by the machine which forms the subject of my invention.

The mechanical parts for twisting are shown generally at $b$ $b$ extending from front to rear of the machine and so arranged as to work in the center of $a$ $a$, and this mechanism is divided into two parts or classes. The one part serves to carry the fabric over the machine at the required speed. The second serves for giving the required twist or twirl to the fringe.

*The Motion for Carrying the Fabric.*

In commencing, the fabric is placed on the machine and is caught by spider-wheels Q, Figs. 3, 5, and 6, which are fixed at an angle, in order to stretch and straighten the untwisted fringe. The first two spider-wheels are covered with a fork $Q^5$, Fig. 6, for the purpose of pressing the fabric onto the wheel-pins. Thence it is passed onto a second pair of spider-wheels $Q^×$, where it is picked up by a third pair $Q''$ and passed under a pair of pulley-brushes $Q'$, which press the piece onto pins of chain $c$, Figs. 2, 5, and 6.

The aforesaid parts are all attached to the platform which carries chain $c$. Chains $c$ are endless chains through the sides of which pins are driven, Fig. 5, and which are used for drawing or carrying the fabric over the twisting apparatus, two being used for each; that is, one catching each edge of fringe. These chains are driven by chain-wheels $d$, Fig. 13, which are so arranged as to allow them to be set to any width, being loose on shaft $r^2$ and driven by a collar $d'$, fixed on the shaft and having a pin $d^2$ screwed into it, which passes through a hole bored into the chain-wheel $d$, thus forming a driver, and at the same time allowing the wheel $d$ to slide horizontally on its shaft. The links of the top half of the aforesaid chain $c$ work between two plates $e$ $e$, one on the bottom and the other on the top, the latter having a slot $e'$, Fig. 6, cut in it for the passage and guidance of the pins in the chain $c$, which stand up above the said top plate or platform $e$ for the purpose of drawing the fabric over the latter. It is to be understood that the slots $e'$ in the top plate or platform are not straight, but have slight curves, as at $e''$, Figs. 3 and $6^a$, in them, which gives the fringe the proper tension as it approaches and leaves the twirling apparatus. The said platform $e$ can be set to any required width by right and left hand screws $f'$ at the back and front of the machine, which screws are worked by a cross-shaft $f''$, having a worm $f'''$ at each end working screw-wheels $f^4$, which are fixed on the ends of the screws $f'$, which give motion to platform $e$ by means of nuts $f$, which are fastened to bottom of it. The aforesaid platform $e$ is thus regulated by hand-wheel $f^2$, Fig. 6.

Mechanical Parts for Twisting the Fringe.

The mechanism for twisting the fringe consists, first, of two screws $g$, right and left handed, respectively, which are made with double-sized threads on part of their length and smaller threads on the remainder, the double-sized thread being run into the smaller thread at the point $i^2$, Figs. 7 and 14. The end of the screw $g'$ has a pin $g^2$ run through it, to the center of which is attached the end of spring $g^3$. The springs are attached to brackets $g^4$, Fig. 1. When the screws revolve, the pins rise and fall because the center of the end of the spring is placed a little higher than the center of the screw, Fig. 9, the latter having a slot in the end, which allows the spring $g^3$ to draw the pins together in the center, as indicated at Fig. 9. The heads of screws $g$ are kept in position by neckties $o$, Figs. 7 and 8, to which is also fixed the plate K, Fig. 7. The other ends of screws $g$ are kept in position by the angle-iron $p$, Fig. 7. The fringe having been drawn by the chain $c$ to the pins $g^2$ is separated by the same and dressed into the screw $g$ in proper portions, as shown in Fig. 14, and is kept in the grooves by plates $h$, Figs. 1, 3, 6, 7, 8, and 10, on the top. The separated threads are carried along, as the screw $g$ revolves, to $i'$, Figs. 7 and 14. Here they come in contact with a revolving rubber or belt $i$ and are rolled or twisted along the plate $k$, which has a rough surface like a smooth file and which is fixed between the screws $g$ level with the bottom of the grooves and can be raised or lowered by the screw $p'$ from underneath. The twisting goes on from the point $i'$ to $i^2$. Here the double-sized thread being cut the screw causes two twists to drop into one groove before leaving the belt $i$. Consequently they get rubbed or twisted by the same, which brings them together before reaching the reverse-twister $l$, Fig. 7. The twists having got to point $i^2$, come in contact with the rubbing-pulley $l$, which rolls or twists them on plate $m$, giving them the final twist. Afterward the fabric is drawn off the machine by means of roller $n$, Figs. 1, 2, 3, and 5, and drops onto the floor.

The twisting or rubbing belt $i$, Fig. 7, is carried by an endless link chain $i^3$, the inside connecting-links being higher than the outside, so as to keep the belt in position. The said chain $i^3$ is driven by chain-wheel $i^4$ at one end, and is carried on drum $i^5$ at the other. (Shown at Figs. 5 and 7.)

The twisting or rubbing pulley $l$ is a flanged pulley, having an india-rubber or leather tire fitted in between flanges $l'$, Fig. 11, and is placed in between the screws from underneath, having a plate $m$ on the top similar to plate $k$.

Driving.

For driving the screws $g$ they carry pinions $p^3$, Figs. 1, 5, and 7, geared together, one of which is extended and geared with the large wheel $p^4$, Figs. 1, 2, 3, 5, 6, and 7, which in turn is driven by a pair of bevel-wheels $p^5 p^6$, Fig. 5. Wheel $p^6$ is on a shaft $s^\times$, which extends through the whole length of the machine and is driven by spur-wheel $s^2$, Figs. 1 and 2.

On the left-hand side of machine, Figs. 1 and 2, are two drums, one, $r^{21}$, fast, the other, $r'$, loose. The fast drum $r^{21}$ has a spur-wheel $r^3$ keyed on its boss and driving wheel $r^4$. The latter drives shaft $r^5$, which gives the motion to the chain-wheel $i^4$, that drives the india-rubber belt $i$. On the shaft $r^5$, at the right-hand side, is a spur-wheel $r^6$, geared into wheel $r^7$, which turns the shaft $r^2$, giving motion to chain $c$. On shaft $r^5$ is a band-pulley $n^2$, driving the drawing-off roller $n$, Figs. 1 and 2, through the pulley $n'$. On shaft $r^5$ is a spur-wheel $s$, Figs. 1 and 2, driving wheel $s^2$ by means of intermediate wheel $s'$, said wheel $s^2$ driving the twisting-screws through the shaft $s^\times$ and the gears $p^5$, $p^6$, $p^4$, and $p^3$, before described. Shaft $r^5$ gives motion to shaft $r$ by a pair of spur-wheels $t$ and $t'$, Figs. 1 and 3, which shaft drives the reversing-rubber $l$. Roller $n$, Figs. 1, 2, and 3, is used for drawing the piece off the machine and is driven by pulley $n'$. The fabric is pressed onto the wooden roller $n$ by an iron roller $n^3$, Fig. 2, which is kept in position by inclined bars $n^4$, Fig. 2. The arrows and thick dotted lines show fabric going through when working.

I claim as my invention—

1. A machine for twisting fringes on shawls, comprising a pair of screws having respectively a right and a left hand thread, means for rotating the screws, means for carrying the fabric to the screws, means for separating the threads of the fabric so that they will enter the screw-threads, a rubber for twisting the threads of the fabric in one direction, a plate coacting therewith and a second rubber and plate for twisting together the portions previously twisted, substantially as described.

2. A machine for twisting fringes on shawls and the like comprising the pair of screws, means for rotating the screws, means for carrying the fabric thereto, means for separating the threads of the fabric and means for twisting these separated threads of the fabric as they lie in the threads of the screws, substantially as described.

3. In combination, in a fringe-twisting machine the screws having their front portions screw-threaded and their rear portions provided with larger threads, means for rotating the screws, means for twisting the fringe in the smaller threads of the screw and means for twisting in pairs the previously-twisted portions of the fringe in the larger screw-threads, substantially as described.

4. In combination, in a fringe-twisting machine, the screws with means for rotating them, the means for carrying the fringe to the screws, the sliding pins at the front ends of the screws with controlling means therefor to separate the threads of the fringe into bunches, and the rubbing means coacting with the screws for twisting the fringe, substantially as described.

5. In combination in a fringe-twisting machine, the screws with rotating means, the rubber means acting therewith to twist the fringe in the threads thereof, the sliding pins at the front ends of the screws and the springs attached thereto for controlling the same, substantially as described.

6. In combination in a fringe-twisting machine, the screws, means for rotating the screws, the traveling rubber belt $i$ with operating means and the plate K, said belt acting between the screws.

7. In combination in a fringe-twisting machine, the screws having the large and the small threads at the rear and front thereof respectively, means for carrying the fabric to the screws, means for rotating the screws, rubbing means acting in connection with the small threads for twisting the fringe, and the rubber means acting in conjunction with the large threads of the screw to twist the twisted portion of the fringe in the opposite direction, substantially as described.

8. In combination in a fringe-twisting machine, the screws with rotating means, the traveling belt and the roughened plate K acting therewith to twist the fringe in one direction, the rubber $l$ and plate $m$ acting to twist the fringe in the opposite direction, and means for carrying the fabric to the screws substantially as described.

9. In combination in a fringe-twisting machine, the twisting means acting to twist the fringe and carrying means diverging toward the twisting means to stretch the fabric, substantially as described.

10. In combination in a fringe-twisting machine, the twisting means and the carrying means comprising the toothed wheels diverging toward the twisting means, substantially as described.

11. In combination, in a fringe-twisting machine, the twisting means and the carrying means, comprising the toothed endless belts, means for moving the same and guiding means having divergent portions to cause the belts to diverge and stretch the fabric, substantially as described.

In testimony whereof I have signed my name to this specification in the presence of two subscribing witnesses.

WALTER GLEDHILL.

Witnesses:
N. TSCHEKALOFF,
J. BLAU.